April 8, 1969 MASAO KAWASHIMA ET AL 3,437,760

PULSE CODE MODULATION REPEATERS

Original Filed July 30, 1964 Sheet 1 of 4

United States Patent Office 3,437,760

Patented Apr. 8, 1969

3,437,760
PULSE CODE MODULATION REPEATERS

Masao Kawashima, Yokohama-shi, and Tsukumo Higeta, Kawasaki-shi, Japan, assignors to Fujitsu Limited, Kawasaki, Japan, a corporation of Japan Continuation of application Ser. No. 386,126, July 30, 1964. This application June 3, 1966, Ser. No. 562,038
Claims priority, application Japan, Mar. 9, 1962, 37/9,321
Int. Cl. H04j 3/08
U.S. Cl. 179—15 7 Claims

ABSTRACT OF THE DISCLOSURE

An equalizer in a regenerative repeater of a pulse code communications system has a characteristic which is such that the total of the frequency characteristic of the transmission line and the frequency characteristic of the equalizer is a differentiated cosine-squared characteristic.

*Description of the invention*

This is a continuation of our copending application Ser. No. 386,126, filed July 30, 1964 and now abandoned, which in turn is a continuation-in-part of our copending application Ser. No. 264,427, filed Mar. 11, 1963 and now abandoned.

This invention relates to pulse code modulation or PCM transmission systems, and particularly to repeaters for such systems.

Pulse code modulation communication systems are characterized by considerable noise tolerance as long as they operate above a predetermined threshold signal-to-noise ratio. The pulse train may be regenerated at intervals along the transmission medium by repeaters which produce sharp clean signal pulses so that little accumulation of noise and distortion results along the transmission path.

The binary information pulse pattern transmitted may be of the "dicode" or "dipulse" type, in which case it has no DC component. However, most PCM systems transmit unipolar pulses having either a pulse width approximately one-half of one bit time, thereby forming a base line between pulses, binary code or binary coded pulse train, or unipolar pulses occupying the complete time slot of each bit, having no base line between individual pulses, "binary" pulses.

With unipolar pulse information the average DC level of the pulse train drifts when the code content changes, thus limiting the pulse recognition accuracy particularly when noise is present, unless the low-frequency cut-off of the repeater input and output transformer is extremely low. Such variation causes an increase of the code "error" and can be improved by expanding the low-frequency characteristic of the transformer to the lowest transmission frequency of pulse pattern, which is approximately 300 cycles per second in case of telephone transmission. However, the transformers used then become difficult to design, expensive, and large, and deteriorate the *S/N* ratio due to dial pulse noise in the low-frequency range or power frequency hum or noise.

In normal PCM, the operation is band-limited to a required transmission bandwidth $fo$. Where the information occupies one-half of the time slot of each bit, the bandwidth $fo$ is equal to $fc$, the bit frequency. Where the entire time slot is occupied with information, $fo=\frac{1}{2} fc$. Normally the signals are subjected to "cosine squared" wave shaping by the repeater circuitry.

It is an object of the present invention to provide a repeater for wave form regeneration which improves the wave form output and stability of existing repeaters.

Another object of the invention is to provide a wave form regenerating system which excludes low-frequency range noise such as dial noise.

Another object of the present invention is to provide an improved repeater having an output wherein the DC level variation due to the pulse pattern is virtually eliminated, having a high signal-to-noise ratio relative to low-frequency noise, and having such properties as to reduce the size and cost of the equipment.

To this end, and according to a feature of our invention, before regenerating the signal pulse train in the repeater, we subject it to equalization, that is, we reshape its wave form by passing the train through a differential circuit producing a differential shaping characteristic such as $$(f/fo)\left(1+\cos \frac{\pi}{2}\cdot f/fo\right) \ldots fo=fc/2$$

or having a second-order differential slope, namely a second-order differentiated shaping characteristic such as $$(f/fo)^2\left(1+\cos \frac{\pi}{2}\cdot f/fo\right) \ldots fo=fc/2$$

By virtue of such equalization, the drift in the average DC component variation due to the pulse pattern is eliminated, thereby providing stable wave form regeneration characteristics.

Other features, objects and advantages of the invention and features by virtue of which they are obtained, will be obvious from the following detailed description when read in light of the accompanying drawings, wherein.

Figure 7:
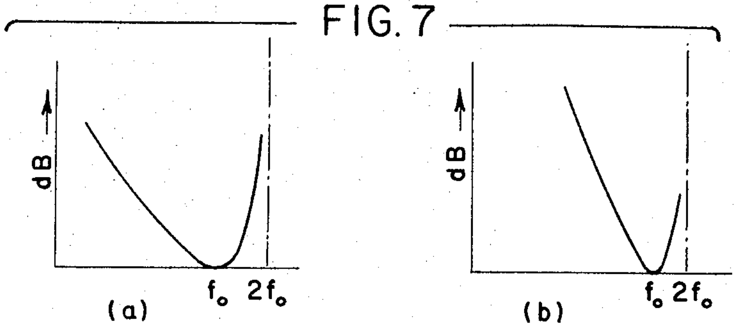
Figure 8:
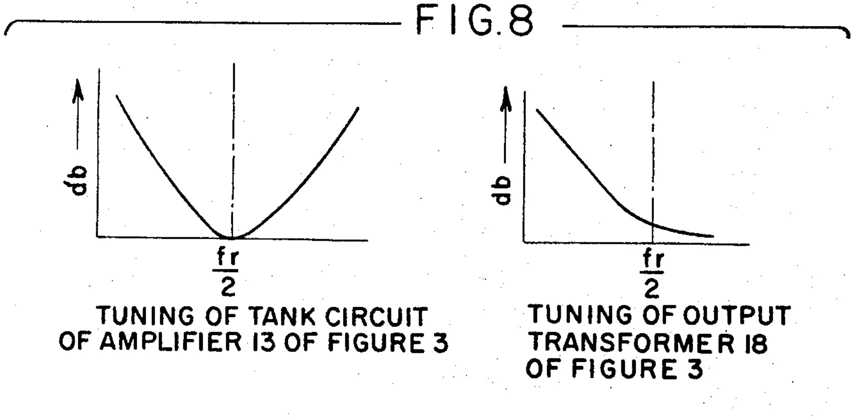

FIG. 7 is a graphical illustration of a pair of amplitude versus frequency characteristics (*a*) and (*b*) of differentiated cosine-squared and second-order differentiated cosine-squared shaping, respectively; and FIG. 8 is a graphical illustration of a pair of amplitude versus frequency characteristics (*a*) and (*b*) of the tuned circuit 29, 31, 32 of the amplifier 13 and of the output transformer 18.

Figure 1:
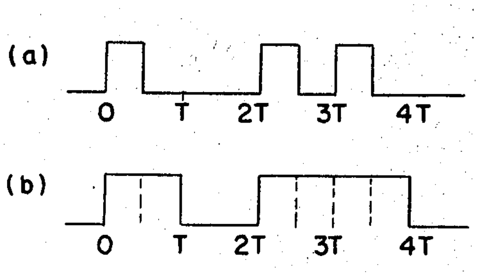
FIG. 1 is a graphical illustration of time-voltage wave forms (*a*) and (*b*) for a binary pulse code or return to zero binary code, and a binary pulse train or non-return to zero binary code.

In wave form (*a*) of FIG. 1, a pulse-coded train includes three pulses in four one-bit time slots T to 4T, each pulse occupying one-half of each of the three time slots having a pulse. In wave form (*b*) of FIG. 1, the same pulse information is shown in the binary pulse system wherein each pulse occupies the entire time slot. The invention is applicable to information transmitted in both of these code systems, although it is particularly applicable to the system illustrated by wave form (*b*).

Figure 2:
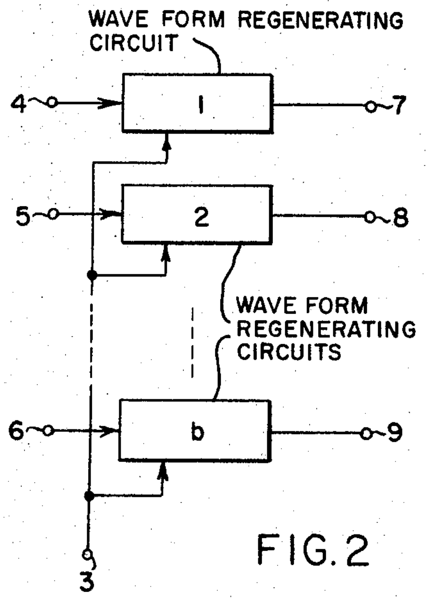
FIG. 2 is a block diagram of a regenerative repeater in a time division series-parallel multiplex PCM system embodying features of the present invention.

In FIG. 2, a repeater for a time-division series-parallel multiplex PCM system comprises identical wave form regenerating circuits 1, 2 . . . *b*, each of which is retimed by a common time wave transmitted by an appropriate synchronizing channel 3. In one embodiment of the invention, the timing wave is transmitted by a synchronization signal inserted in the low-frequency range of the appropriate channels 1, 2 . . . *b*. The wave form regenerating circuits have input terminals 4, 5 and 6, respectively, and output terminals 7, 8 and 9, respectively.

Figure 3:
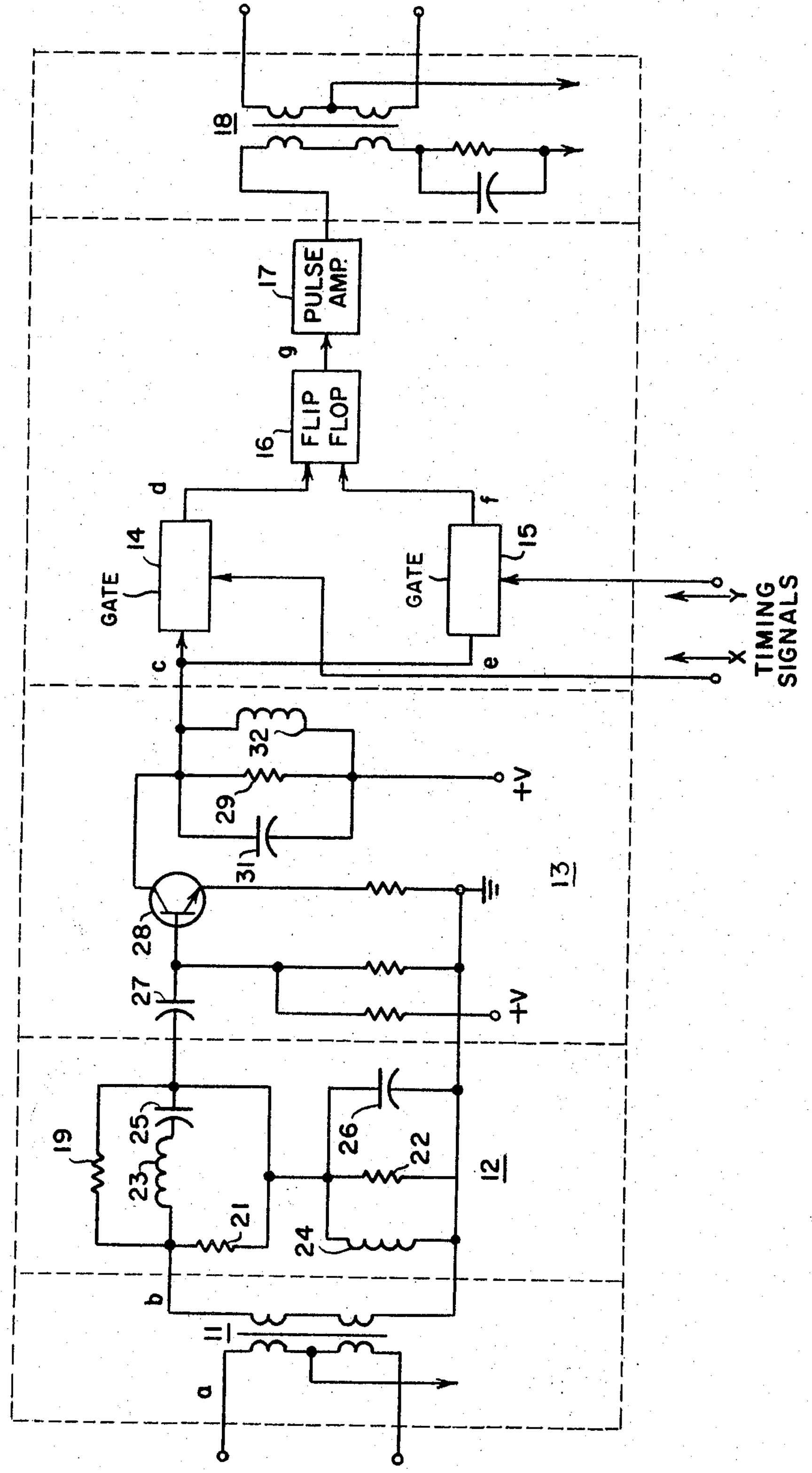
FIG. 3 is a diagram, partly in block form, of an embodiment of a wave form regeneration circuit which may be used in the regenerative repeater of the time division series-parallel multiplex PCM system of FIG. 2 and which uses binary pulse transmission code.
Figure 6:
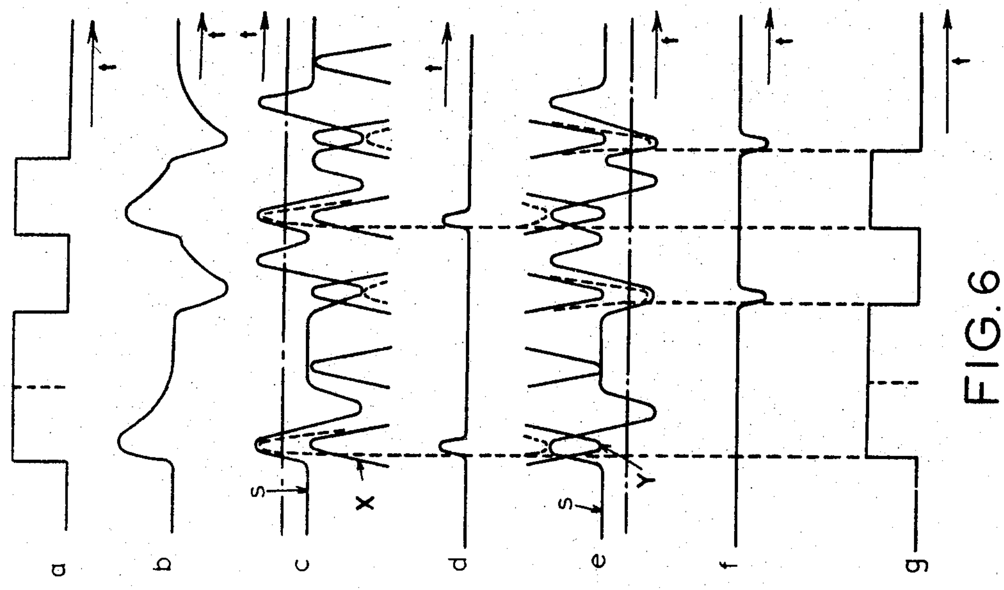
FIG. 6 is a graphical illustration of voltage-time wave forms (*a*) to (*g*) showing the wave form regenerating process in a wave form regeneration circuit using second-order "differentiated cosine-squared" characteristics as equalization shaping of the pulse train.
Figure 5:
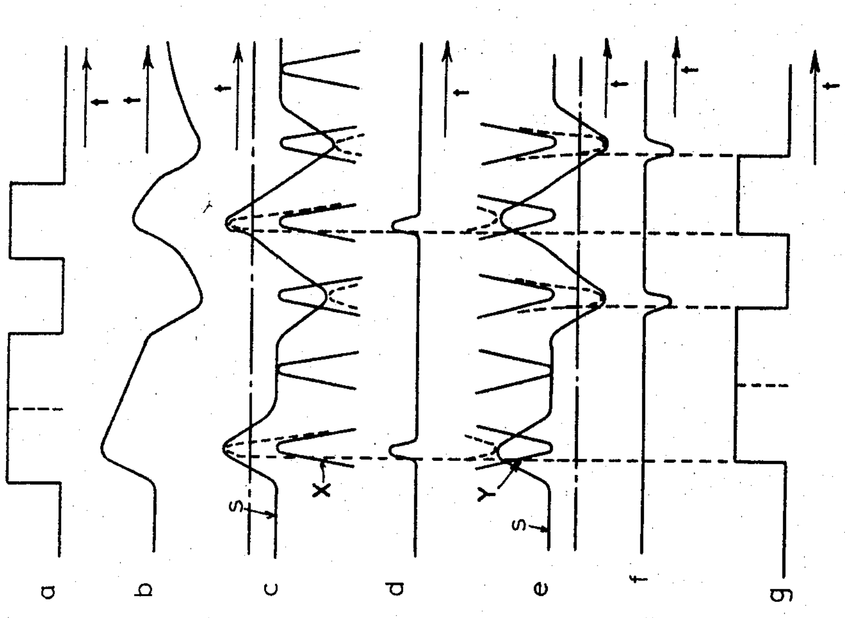
FIG. 5 is a graphical illustration of voltage-time wave forms (*a*) to (*g*) showing the wave form regenerating process in a wave form regeneration circuit using "differentiated cosine-squared" characteristics.

FIG. 3 is a diagram of a wave form regenerating circuit which may be utilized as one of the circuits 1 to *b* in FIG. 2 for operation with the information shown by wave form (*b*) of FIG. 1 and also shown by wave forms (*a*) of FIGS. 5 and 6. The wave forms identified at specific points in FIG. 3 by the letters *a, b, c, d, e, f, g* correspond to the wave forms *a, b, c, d, e, f, g* of FIGS. 5 and 6.

In FIG. 3, an input transformer 11 converts an input wave form *a* (FIGS. 5 and 6) to a wave form *b* which is supplied to an equalizer 12. The equalizer 12 transmits the wave form *b* to an amplifier 13 which converts the wave form *b* to a wave form *c* and a wave form *e*, indicated as wave forms *s* of FIGS. 5 and 6, *c* and *e*. The wave forms *c* and *e* are supplied to retiming circuits or gates 14 and 15, respectively, which produce wave forms *d* and *f*, respectively. The wave forms *d* and *f* are supplied to a flip-flop circuit 16 which produces an output wave form *g*. The wave form *g* is supplied to the output of the circuit via a pulse amplifier 17 and an output transformer 18.

In FIG. 3, an input terminal 4 of the repeater 1, for example, shown in FIG. 2 and indicated in FIG. 3 by an input terminal to the transformer 11 and by the outer broken line boundary, leads to the input transformer 11 which provides balance-unbalance conversion and power separation. The high-frequency cut-off of the input transformer 11 is preferably around $fc/2=fo$ and its low-frequency cut-off greater than $fc/30$. This is a bandwidth narrower than in known repeater systems.

An equalizer 12 comprises three resistors 19, 21 and 22, two inductors 23 and 24, and two capacitors 25 and 26. The equalizer 12 is connected to an amplifier 13 which comprises a coupling capacitor 27, and a transistor 28 whose output is tuned to approximately $fo=fc/2$, as shown in curve (*a*) of FIG. 8, by a tuner comprising a resistor 29, a capacitor 31 and an inductor 32.

The equalizer 12 functions as an impedance-matched two pole network and has an amplitude frequency characteristic which equalizes the frequency characteristic of the line into an approximate cosine-square shaping characteristic having a cut-off frequency of approximately one-half the input pulse fundamental frequency *fr*.

The amplifier 13 is a common emitter type transistor amplifier. The tuned circuit 29, 31, 32 is of comparatively low Q and is tuned to approximately $fr/2$.

Figure 4:
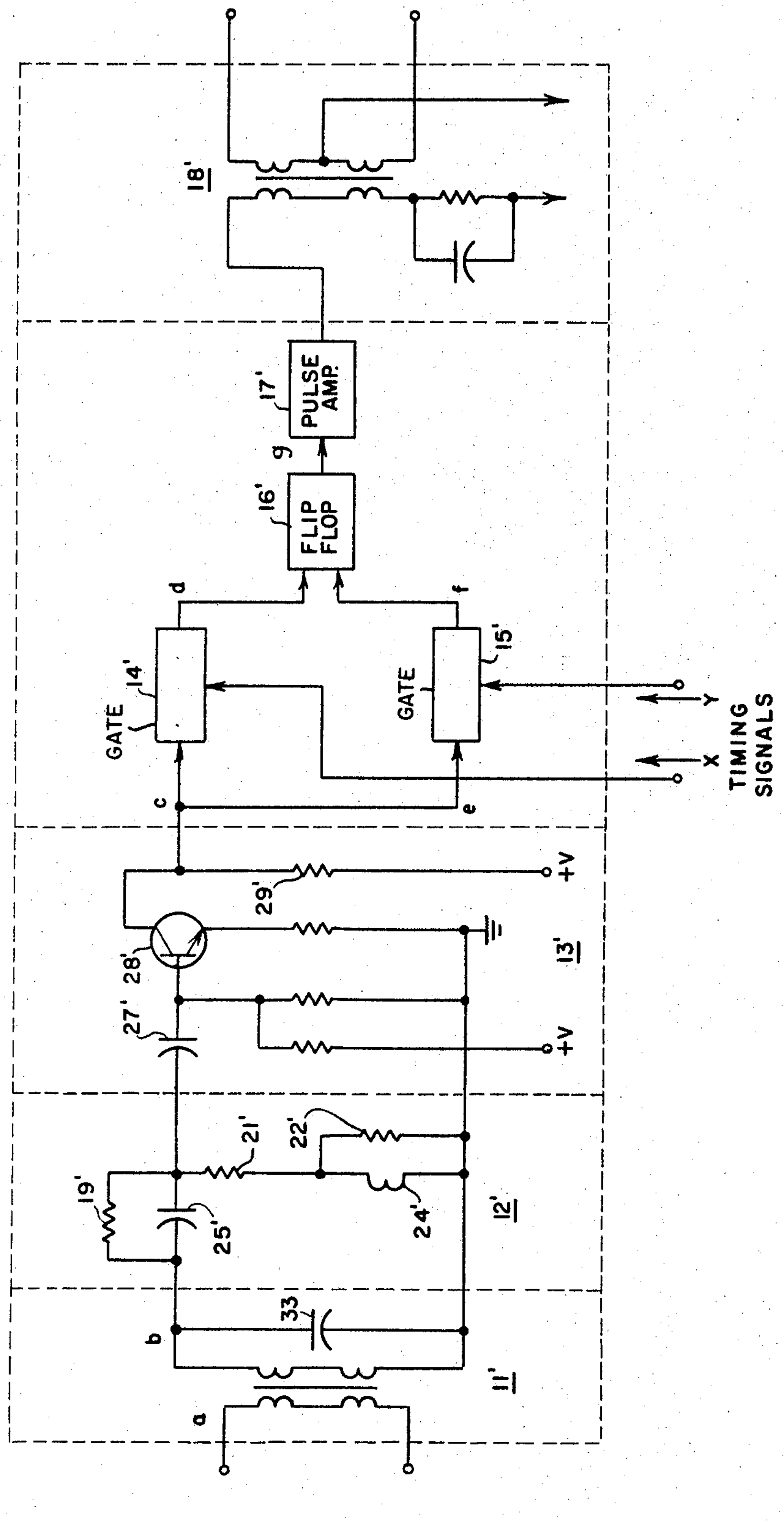
FIG. 4 is a diagram, partly in block form, of a modification of the wave form regeneration circuit of FIG. 3.

In FIG. 4, which is a modification of the embodiment of FIG. 3, the input transformer 11′ differs from the input transformer 11 of FIG. 3 by a capacitor 33 shunted across its secondary windings. The equalizer 12′ differs from the equalizer 12 by the utilization of resistors 19′, 21′ and 22′, inductor 24′ and capacitor 25′. The amplifier 13′ differs from the amplifier 13 of FIG. 3 by the utilization of the single resistor 29′ instead of the tuned circuit 29, 31, 32. In FIG. 4, the input transformer 11′ is a low Q tuning transformer tuned to $fc/2$ and equalization is achieved by an impedance-matched equalizer 12′. The arrangement of FIG. 4 provides a sufficient equalization characteristic, since in PCM regenerative relay systems high precision equalization, such as in conventional analog amplitude transmission systems, is not required.

A pair of retiming circuits 14 and 15, in FIG. 3, are connected to the output of the amplifier 13. Timing signals for each pulse position are shown by the pulses X and Y in the curves *c* and *e* of FIGS. 5 and 6. The retiming circuits 14 and 15 function as coincidence gates. The retiming circuit 14 passes a positive pulse (*d*) from the equalization amplifier 13 when such a pulse is received simultaneously with a timing pulse X by said retiming circuit. The retiming circuit 15 passes a negative pulse (*f*) from the equalization amplifier 13 when such a pulse is received simultaneously with a timing pulse Y by said retiming circuit. The operation of the retiming circuits 14 and 15 is illustrated by curves (*c*) and (*e*) of FIGS. 5 and 6.

The timing signals X and Y are provided by a separate oscillator source of timing signals which is synchronized with the information frequency by an externally transmitted timing signal. If the input signal were of the type occupying only one-half the time of each bit, the incoming information signals would have a continuous component corresponding to the bit frequency. This component could synchronize the oscillator producing the timing waves.

The outputs of the retiming circuits 14 and 15 are shown in curves (*d*) and (*f*) of FIGS. 5 and 6. The output of the retiming circuit 14 is applied to one of the inputs of the bistable multivibrator or flip-flop 16 and the output of the retiming circuit 15 is applied to the other of the inputs of said bistable multivibrator. The flip-flop 16 may comprise a Schmitt trigger circuit and functions to regenerate the pulses in the manner shown by curves (*g*) of FIGS. 5 and 6.

The regenerated pulses provided by the flip-flop 16 are supplied to the pulse amplifier 17, which amplifies the regenerated pulses and applies them to the output transformer 18. The output transformer 18 has a high-pass frequency characteristic as shown in curve (*b*) of FIG. 8. The regenerated binary wave forms are amplified up to a specific level by the pulse amplifier 17 and transmitted to the next line.

The circuits 12 and 13 together equalize the line characteristics of the input transformer 11 and the output transformer 18 of the repeater in the form of a first or second-order differentiated shaping characteristic. Thus, the pulse pattern (*a*) which is transmitted as shown by curve (*b*) of FIGS. 5 and 6, and contains noise and distortion, is equalized and shaped by the circuits 12 and 13. At points *c* and *e* of FIGS. 3 and 4 each of the signals has been equalized and shaped to a wave form having little or no DC drift, similarly to the wave forms *s* of curves (*c*) and (*e*) of FIGS. 5 and 6. The invention contemplates the equalization shaping occurring at only one circuit stage, such as 12, 13 or 18, or being distributed among any combination of these circuit stages.

The wave form *s* of FIG. 5 illustrates the case of differential shaping, and FIG. 6 illustrates the case of second-order differentiation.

In the system using the "differentiated cos squared" characteristic for equalization, the equalized and shaped wave forms corresponding to each changing point of the pulse pattern have the wave shapes shown by the wave form *s* of curve (*c*) of FIG.5. Therefore, actually orthogonality between pulses it not completely attained; positive or negative pulses being generated alternately so that changes of average DC level do not accumulate. However, the DC drift is considerably reduced to within the low-frequency cut-off of the transformer.

In the system using the second-order "differential cos squared" characteristic, the minimum attenuation point of the total equalization characteristic moves somewhat to a higher frequency than the "differentiated cos squared" characteristic as shown in curve (*b*) of FIG. 7. However, as shown in curve (*c*) of FIG. 5, an equalized and shaped wave form having almost no DC drift is obtained because each voltage change produces a positive and negative pulse. This results in a high signal-to-noise ratio as regards low-frequency noise because of the second-order differential slope.

The first or second-order "differentiated" shaping characteristic for equalization achieves a stable wave form regenerating characteristic having decreased average DC drift due to the pulse pattern. It provides a high signal-to-noise ratio with respect to low-frequency noise such as dial impulse noise. The first or second-order differential slope simplifies transformer design and permits small size and low cost. This is accomplished by performing appropriate parts of equalization at the repeater input and output transformers, namely, for example, by making the input transformer, or the output transformer, or both, tuning transformers having appropriate selectivity.

The present invention provides a stable signal regeneration characteristic, having the aforementioned various properties, for the various coded pulse groups in time division series-parallel multiplex PCM systems using appropriate external timing.

It has been proposed to use appropriate external retiming by transmitting the bit frequency or its synchronizing wave by proper means and arranging the two groups of "the columns of the groups of the parallel PCM codes" or "the rows of the groups of the series PCM codes." These have the appropriate multiplex number and comprise "binary code" pulses shown in curve (*a*) of FIG. 1, so that the respective pulse trains may occupy one-half the time slot of one bit alternately, thus making it a "binary" pulse. This renders the form of code transmission a time division or series-parallel multiplex PCM signal having a maximum of two times as much information as the multiplex number of the initial "columns of the code groups" or "rows of code groups." This can be transmitted by the same "required transmission bandwidth" as the bit frequency $fc$ of the "basic group." Furthermore, by arranging each coded pulse in the one group of the aforementioned "columns of the code groups" or "rows of the code groups," so that it occupies the whole time slot of one bit, the "required transmission bandwidth" of these "basic groups" can be made one-half of the bit frequency $fc$.

In the foregoing description, "the rows of the groups of the series codes" means the time division multiplied series PCM coded pulse train. "The columns of the groups of the parallel codes" refers to the columns of the time division series-parallel multiplex PCM code group obtaining a multiplex number of $b$ times as much as the aforementioned basic group in which the series signal of each CH bit is distributed into parallel corresponding transmission lines, by providing series PCM coded pulses having the proper multiplex number to the basic group and using transmission line equal to CH bit number $b$.

The present invention in one of its embodiments is applicable to multiplex PCM codes, in which, by arranging the two groups of "the columns of the parallel code groups" or "the rows of the series code groups" consisting of the binary coded pulses, so that the pulses of the repeater groups use one-half of one bit time slot alternately, two times as many multiplex numbers as the "basic groups" are obtained and at the same "required transmission bandwidth" as the "basic groups." The present invention is also applicable to the multiple PCM code groups in which the "required transmission bandwidth" is one-half the "basic groups," by using all the time slots of one bit by one group of the aforementioned "columns of the code groups" or "rows of the code groups."

The invention makes possible code regeneration of so-called "external synchronization type" or code regeneration relay transmission with a transmission bandwidth of one-half the pulse basic frequency $fc$ by attenuating the low-frequency component energy spectrum of the pulse pattern output. This is achieved by providing an appropriate amount of equalization characteristic against the line load, for example by providing a first-order differential slope at the output side of the repeater, or making the sending pulses correspond to "dicode" pulses, and inserting and transmitting an external synchronization signal which has a synchronizing relation with the pulse basic frequency, to an appropriate frequency point in this frequency band. Then the original pulse basic frequency is picked up by proper modulation means in each repeater, without using a special synchronization channel other than code transmission circuits. Furthermore, with the aforementioned equalization means, by providing appropriate equalization at the relay output side, the low-frequency energy spectrums of sending pulse are attenuated. Thus, the appropriate communication signal other than the aforementioned synchronization signal, for example the repeater inspection signal, the control signal and liaison telephone signals, etc., may be transmitted by the band. Furthermore, cross-talk or noise to other carrier systems are improved or reduced and permit coexistence with other systems when the transmission power of the low-frequency band is attenuated.

While various embodiments of the invention have been disclosed in detail, it will be obvious to those skilled in the art that the invention may be embodied otherwise.

We claim:

1. In a digital code system comprising a transmission line, input means for receiving via said transmission line coded pulses varying in their average DC levels due to variation in the pulse pattern, timing means, coincidence means connected to said timing means and pulse forming output means connected to said coincidence means for regenerating said pulses, equalization means connected between said input means and said coincidence means for shaping the transmitted frequency characteristic of said pulses, said equalization means having a characteristic which is such that the total of the frequency characteristic of said transmission line and the frequency characteristic of said equalization means is a differentiated cosine-squared characteristic and including a tuned circuit tuned to approximately half the fundamental frequency of the pulses received by said input means.

2. In a digital code regenerative relay system comprising a transmission line, input means for receiving via said transmission line coded pulses varying in their average DC levels due to variation in the pulse pattern, timing means, coincidence means connected to said timing means and pulse forming output means connected to said coincidence means for regenerating said pulses, equalization means connected between said input means and said coincidence means for shaping the transmitted frequency characteristic of said pulses, said equalization means having a characteristic which is such that the total of the frequency characteristic of said transmission line and the frequency characteristic of said equalization means is a first order differentiated cosine-ssuared characteristic and including a tuned circuit tuned to approximately half the fundamental frequency of the pulses received by said input means.

3. In a digital code regenerating relay system comprising a transmission line, input means for receiving via said transmission line coded pulses varying in their average DC levels due to variations in the pulse pattern, timing means, coincidence means connected to said timing means and pulse forming output means connected to said coincidence means for regenerating said pulses, equalization means connected between said input means and said coincidence means for shaping the transmitted frequency characteristic of said pulses, said equalization means having a characteristic which is such that the total of the frequency characteristic of said transmission line and the frequency characteristic of said equalization means is a second order differentiated cosine-squared characteristic and including a tuned circuit tuned to approximately half the fundamental frequency of the pulses received by said input means.

4. In a digital code regenerative relay transmission system for relay transmission of time division multiplex PCM code groups having twice the multiplex number as the column of the code groups or rows of the code groups in the same bandwidth as the base groups comprising a transmission line, input means for receiving via said transmission line pulses occupying adjacent halves in one time slot, timing means for receiving transmitted timing pulses and means connected to said timing means and said input means for separating the pulses whereby DC level variations in the pulses are eliminated, equalization means connected to said input means having a characteristic which is such that the total of the frequency characteristic of said transmission line and the frequency characteristic of said equalization means is a differentiated cosine-squared characteristic for shaping the transmission frequency characteristic of said pulses and including a tuned circuit tuned to approximately half the fundamental frequency of the pulses received by said input means.

5. In a digital code regenerative relay transmission system comprising a transmission line, input means for receiving via said transmission line column of the code group and row of the code group binary signals occupying a complete time slot, timing means for receiving timing signals, means connected to said timing means for producing pulses and pulse forming means connected to said last-mentioned means for producing output pulses, equalization means connected between said input means and said means to which said pulse forming means is connected, said equalization means having a characteristic which is such that the total of the frequency characteristic of said transmission line and the frequency characteristic of said equalization means is a differentiated cosine-squared characteristic for shaping the transmission characteristic of the binary signals and including a tuned circuit tuned to approximately half the fundamental frequency of the pulses received by said input means.

6. In a digital code regenerative relay system comprising a transmission line, input means for receiving via said transmission line coded pulses varying in their average DC levels due to variation in the pulse pattern, timing means, coincidence means connected to said timing means and pulse forming output means connected to said coincidence means for regenerating said pulses, said timing means receiving input signals from said pulse forming output means, equalization means connected between said input means and said coincidence means for shaping the transmitted frequency characteristics of said pulses, said equalization means having a characteristic which is such that the total of the frequency characteristic of said transmission line and the frequency characteristic of said equalization means is a differentiated cosine-squared characteristic and including a tuned circuit tuned to approximately half the fundamental frequency of the pulses received by said input means.

7. In a digital code regenerative relay system comprising a transmission line, input means for receiving via said transmission line coded pulses varying in their average DC levels due to variations in the pulse pattern, timing means, coincidence means connected to said timing means, pulse forming output means connected to said coincidence means for regenerating said pulses and means for applying to said timing means synchronizing signals in the low frequency portion of a determined bandwidth, equalization means connected between said input means and said coincidence means for shaping the transmitted frequency characteristic of said pulses, said equalization means having a characteristic which is such that the total of the frequency characteristic of said transmission line and the frequency characteristic of said equalization means is a differentiated cosine-squared characteristic and including a tuned circuit tuned to approximately half the fundamental frequency of the pulses received by said input means, and said equalization means having said determined bandwidth.

References Cited

UNITED STATES PATENTS

| | | | |
|---|---|---|---|
| 2,748,270 | 5/1956 | Eckert et al. | 328—164 |
| 2,753,526 | 7/1956 | Ketchledge | 333—28 |
| 2,856,525 | 10/1958 | Lubkin | 328—164 XR |
| 2,895,111 | 7/1959 | Rothe | 333—28 |
| 2,992,341 | 7/1961 | Andrews et al. | 179—15 |
| 2,996,578 | 8/1961 | Andrews | 178—70 |

RALPH D. BLAKESLEE, *Primary Examiner.*

U.S. Cl. X.R.

178—70; 179—15; 328—27, 63, 164; 333—28